US012693027B2

(12) United States Patent
Gong et al.

(10) Patent No.: US 12,693,027 B2
(45) Date of Patent: Jul. 28, 2026

(54) DETACHABLE ELECTRIC FIREPLACE

(71) Applicant: ZHONGSHAN SHANGXIAN ELECTRICAL APPLIANCES TECHNOLOGY CO., LTD., Zhongshan (CN)

(72) Inventors: Jianbing Gong, Zhongshan (CN); Fangyou Chen, Zhongshan (CN); Mingchi Zhou, Heyuan (CN)

(73) Assignee: ZHONGSHAN SHANGXIAN ELECTRICAL APPLIANCES TECHNOLOGY CO., LTD., Zhongshan (CN)

( * ) Notice: Subject to any disclaimer, the term of this patent is extended or adjusted under 35 U.S.C. 154(b) by 445 days.

(21) Appl. No.: 18/464,277

(22) Filed: Sep. 11, 2023

(65) Prior Publication Data

US 2025/0035321 A1 Jan. 30, 2025

(30) Foreign Application Priority Data

Jul. 30, 2023 (CN) ......................... 202322021178.1

(51) Int. Cl.

| | |
|---|---|
| ***F24D 13/00*** | (2006.01) |
| ***F21S 10/04*** | (2006.01) |
| ***F24B 1/18*** | (2006.01) |
| ***F24C 3/00*** | (2006.01) |
| ***F24C 7/00*** | (2006.01) |

(52) U.S. Cl.

CPC .............. *F24D 13/00* (2013.01); *F21S 10/04* (2013.01); *F21S 10/046* (2013.01); *F24B 1/1808* (2013.01); *F24C 3/006* (2013.01); *F24C 7/004* (2013.01); *F24D 2200/08* (2013.01); *F24D 2200/10* (2013.01)

(58) Field of Classification Search

None

See application file for complete search history.

(56) References Cited

U.S. PATENT DOCUMENTS 1,719,622 A * 7/1929 Price ....................... F24C 7/004 40/428

1,827,941 A * 10/1931 Gross ...................... F24C 7/004 362/808

(Continued)

FOREIGN PATENT DOCUMENTS

CN 212252810 U * 12/2020

*Primary Examiner* — Jorge A Pereiro

(57) ABSTRACT

A detachable electric fireplace includes a base, at least one artificial firewood assembly detachably disposed on a top of the base, at least one light source assembly detachably disposed on the base, and a flame simulation assembly disposed inside the base. The at least one artificial firewood assembly includes a firewood support and an artificial firewood. The firewood support is detachably disposed on the base. A light-transmitting hole is defined on the firewood support. The artificial firewood is detachably disposed on the firewood support and is disposed above the light-transmitting hole. The artificial firewood is a light-transmitting hollow structure. The at least one light source assembly is disposed below the light-transmitting hole. Light emitted by the at least one light source assembly penetrates through the light-transmitting hole to light up the artificial firewood. The detachable electric fireplace is able to be disassembled for storage.

18 Claims, 7 Drawing Sheets

(56) References Cited

U.S. PATENT DOCUMENTS

| | | | | |
|---|---|---|---|---|
| 3,499,239 | A * | 3/1970 | Mungo | F21S 10/04<br>40/428 |
| 3,526,984 | A * | 9/1970 | Nielsen | F24C 7/004<br>472/64 |
| 3,603,013 | A * | 9/1971 | Reed | F21S 10/04<br>40/428 |
| 4,026,544 | A * | 5/1977 | Plambeck | F21S 10/04<br>472/64 |
| 7,334,360 | B1 * | 2/2008 | Corry | G09F 19/12<br>472/65 |
| 7,373,743 | B1 * | 5/2008 | Hess | F24C 7/004<br>362/253 |
| 2003/0156828 | A1 * | 8/2003 | Jamieson | F24C 7/004<br>40/427 |
| 2004/0255931 | A1 * | 12/2004 | Bachinski | F24C 7/004<br>126/92 AC |
| 2009/0080871 | A1 * | 3/2009 | Chiu | F24C 7/004<br>392/348 |
| 2013/0139422 | A1 * | 6/2013 | Lu | F24C 7/004<br>40/428 |
| 2017/0089587 | A1 * | 3/2017 | Nemes | F24C 15/36 |
| 2017/0307223 | A1 * | 10/2017 | Li | F24C 7/004 |
| 2017/0328575 | A1 * | 11/2017 | Crowe | F24C 7/004 |
| 2018/0363870 | A1 * | 12/2018 | Jones | F24C 7/004 |
| 2020/0363028 | A1 * | 11/2020 | Lassen | F24C 7/004 |
| 2021/0088221 | A1 * | 3/2021 | Crowe | H05B 1/0277 |
| 2021/0404667 | A1 * | 12/2021 | Crowe | F24C 7/004 |
| 2022/0290866 | A1 * | 9/2022 | Crowe | F24H 9/2071 |
| 2023/0175660 | A1 * | 6/2023 | Lassen | F21S 10/046<br>362/234 |
| 2023/0204172 | A1 * | 6/2023 | Walker | F24C 7/004<br>392/348 |
| 2025/0020331 | A1 * | 1/2025 | Chu | F21S 10/046 |

* cited by examiner

DETACHABLE ELECTRIC FIREPLACE

TECHNICAL FIELD

The present disclosure relates to a technical field of electric fireplaces, and in particular to a detachable electric fireplace.

BACKGROUND

Electric fireplaces are a kind of electric heating equipment. Compared with conventional wood-burning fireplaces and gas fireplaces, the electric fireplaces do not produce soot that is difficult to clean, strange smell, and noise when in operation. Moreover, a surface temperature of the electric fireplaces is not high, so it is safer and more reliable when in use. In addition, the electric fireplaces further have advantages of saving heating costs and environmentally friendly.

Due to a limitation of logistics packaging, most of current electric fireplaces on the market adopt a mode of dismantling into components for shipping, and users should install the components by themselves. However, the mode also brings many problems. For instance, when a connecting wire terminal is not correctly connected during installation, the current electric fireplaces are unable to emit light, and the current electric fireplaces are generally unable to be disassembled again after installation, which are inconvenient to store.

Defects mentioned above are urgently needed to be solved by those skilled in the art.

SUMMARY

A purpose of the present disclosure is to overcome defects in the prior art. The present disclosure provides a detachable electric fireplace, which is easy to assemble, is able to be disassembled and stored again after installation, and brings good customer experience.

To solve above technical problems, the present disclosure provides the detachable electric fireplace. The detachable electric fireplace comprises a base, at least one artificial firewood assembly detachably disposed on a top of the base, at least one light source assembly detachably disposed on the base, and a flame simulation assembly disposed inside the base.

The at least one artificial firewood assembly comprises a firewood support and an artificial firewood. The firewood support is detachably disposed on the base. A light-transmitting hole is defined on the firewood support. The artificial firewood is detachably disposed on the firewood support and is disposed above the light-transmitting hole. The artificial firewood is a light-transmitting hollow structure. The at least one light source assembly is disposed below the light-transmitting hole. Light emitted by the at least one light source assembly penetrates through the light-transmitting hole to light up the artificial firewood.

After the detachable electric fireplace is assembled, the detachable electric fireplace is able to be disassembled for storage, which has strong practicability. The light-transmitting hole is defined on the firewood support. The artificial firewood is the light-transmitting hollow structure and is disposed above the light-transmitting hole, the at least one light source assembly is disposed below the light-transmitting hole, and the light emitted by the at least one light source assembly penetrates through the light-transmitting hole to light up the artificial firewood, so that there is no need to dispose lamp beads inside the artificial firewood, and a step of docking the artificial firewood with connecting wires is omitted, which is convenient for users to install. At the same time, it also avoids a risk of light failure caused by loosen of terminals of the connecting wires, which is conducive to improving the user experience.

Furthermore, the base comprises a base main body and a cover plate. An opening is defined on a top of the base main body. The base main body is hollow. The cover plate covers on the top of the base main body. The flame simulation assembly is disposed inside the base main body. The cover plate comprises a mounting portion and a rear cover portion connected to the mounting portion. The at least one artificial firewood assembly is detachably disposed on the mounting portion. The at least one artificial firewood assembly comprises the firewood support detachably disposed on the mounting portion and the artificial firewood detachably disposed on the firewood support. The at least one light source assembly is detachably disposed on the mounting portion.

Optionally, the firewood support comprises an inclined portion and a horizontal portion connected to the inclined portion. An inclination angle of the inclined portion is 5-45 degrees. The artificial firewood is detachably disposed on the inclined portion of the firewood support.

Optionally, the mounting portion comprises first through holes, and the first through holes are located below the light-transmitting hole of the firewood support. The at least one light source assembly comprises LED lamp beads, and the LED lamp beads respectively pass through the first through holes to illuminate the artificial firewood, which facilitates the user to install the detachable electric fireplace.

Optionally, the firewood support comprises fasteners, and the mounting portion comprises second through holes corresponding to the fasteners. The fasteners are one-to-one inserted into the second through holes.

Optionally, the firewood support comprises a first limiting groove and a second limiting groove. Third through holes are defined on the mounting portion. The at least one artificial firewood assembly comprises a poke piece configured to connect the firewood support to the mounting portion. A first end of the poke piece is inserted into the first limiting groove and a second end of the poke piece passes through the second limiting groove. A boss is disposed on a bottom of the poke piece. The boss is inserted into a corresponding one of the third through holes.

In the embodiment, the poke piece is provided, the first end of the poke piece is inserted into the first limiting groove and the second end of the poke piece passes through the second limiting groove, and the boss disposed on the bottom of the poke piece is inserted into the corresponding one of the third through holes, so that a connection between the firewood support and the cover plate is enhanced, which improves stability of the detachable electric fireplace.

Optionally, the flame simulation assembly comprises a heating mechanism disposed inside the base main body and a flame light mechanism disposed inside the base main body. An air outlet is defined on a front end of the base main body. An air inlet is defined on a rear end of the base main body. Air heated by the heating mechanism is output from the air outlet defined on the front end of the base main body, which realizes a heating function of the detachable electric fireplace.

Furthermore, the flame light mechanism comprises a light shielding plate, a reflector, and a light panel. The light shielding plate is detachably disposed on the base main body. The reflector is disposed on an inner side of the light shielding plate; the light panel is disposed on the inner side of the light shielding plate and opposite to the reflector. Flame-shaped through holes are defined on a surface of the rear cover portion close to the rear end of the base main body. The reflector reflects light emitted by the light panel to the flame-shaped through holes on the rear cover portion. Therefore, a scene of burning flame simulated by the detachable electric fireplace is realistic, and a three-dimensional visual effect is good.

Optionally, the light shielding plate is detachably disposed on the base main body and surrounds the rear cover portion of the cover plate to form an accommodating cavity. The reflector and the light panel are accommodated in the accommodating cavity, which improves a space utilization rate of an interior of the detachable electric fireplace.

Optionally, a main control board is disposed inside the base main body. The main control board is electrically connected to the at least one light source assembly and the flame simulation assembly. A window is disposed on a front end of the base main body. An operation panel is embedded in the window. The operation panel is electrically connected to the main control board and controls the at least one light source assembly and the flame simulation assembly through the main control board. Optionally, the mounting portion and the rear cover portion are integrally formed.

Optionally, the artificial firewood is snapped with or screwed with the firewood support, so that after installation, the artificial firewood and the firewood support are able to be disassembled again for storage.

Optionally, a decorative layer is disposed on outer surfaces of the artificial firewood except a surface of the artificial firewood contacting the firewood support. An uneven simulated wood grain texture is defined on a surface of the decorative layer, making a simulated wood burning scene of the electric fireplace realistic.

Optionally, an anti-slip groove is defined on a bottom of the second end of the poke piece passing through the second limiting groove, which facilitates the user to install the poke piece on the firewood support.

Optionally, the poke piece is a plastic piece.

Optionally, the air outlet is of a grille structure or through holes disposed in an array. The air inlet is of a grille structure or through holes disposed in an array. When the air outlet and the air inlet are through holes, the through holes are circular holes or special-shaped holes.

Optionally, horn-shaped mesh enclosures are respectively disposed in the air outlet and the air inlet.

Optionally, the detachable electric fireplace further comprises a front firewood frame disposed on the front end of the base main body.

Optionally, mounting holes are respectively defined two sides of the front end of the base main body. Protrusions are respectively disposed at two ends of the front firewood frame. The protrusions are respectively inserted into the mounting holes.

Compared with the prior art, in the detachable electric fireplace, the at least one artificial firewood assembly is detachably disposed on the top of the base. The at least one artificial firewood assembly comprises the firewood support and the artificial firewood. The firewood support is detachably connected to the base, the artificial firewood is detachably connected to the firewood support, and the flame simulation assembly is disposed inside the base, so that after the detachable electric fireplace is assembled, the detachable electric fireplace is able to be disassembled for storage, which is highly practical. The light-transmitting hole is defined on the firewood support, and the artificial firewood is a light-transmitting hollow structure and is disposed above the light-transmitting hole. The at least one light source assembly is disposed below the light-transmitting hole. The light emitted by the at least one light source assembly penetrates through the light-transmitting hole to light up the artificial firewood, so that there is no need to dispose the lamp beads inside the artificial firewood, and the step of docking the artificial firewood with connecting wires is omitted, which is convenient for users to install. At the same time, it also avoids a risk of light failure caused by loosen of terminals of the connecting wires, which is conducive to improving the user experience.

Further, the decorative layer is disposed on the outer surfaces of the artificial firewood except the surface of the artificial firewood contacting the firewood support. The uneven simulated wood grain texture is defined on the surface of the decorative layer, making the simulated wood burning scene of the detachable electric fireplace realistic. The flame light mechanism is disposed inside the base main body, and the flame light mechanism comprises the light shielding plate, the reflector, and the light panel. The light shielding plate is detachably disposed on the base main body. The reflector is disposed on the inner side of the light shielding plate. The light panel is disposed on the inner side of the light shielding plate and opposite to the reflector. The reflector is rotatably connected to the light shielding plate. The fame-shaped through holes are defined on the surface of the rear cover portion close to the rear end of the base main body. The reflector reflects the light emitted by the light panel to the flame-shaped through holes on the rear cover portion. Therefore, the scene of burning flame is simulated. When the reflector rotates, the scene of the burning flame simulated by the detachable electric fireplace is realistic, and the three-dimensional visual effect is good.

Figure 1:
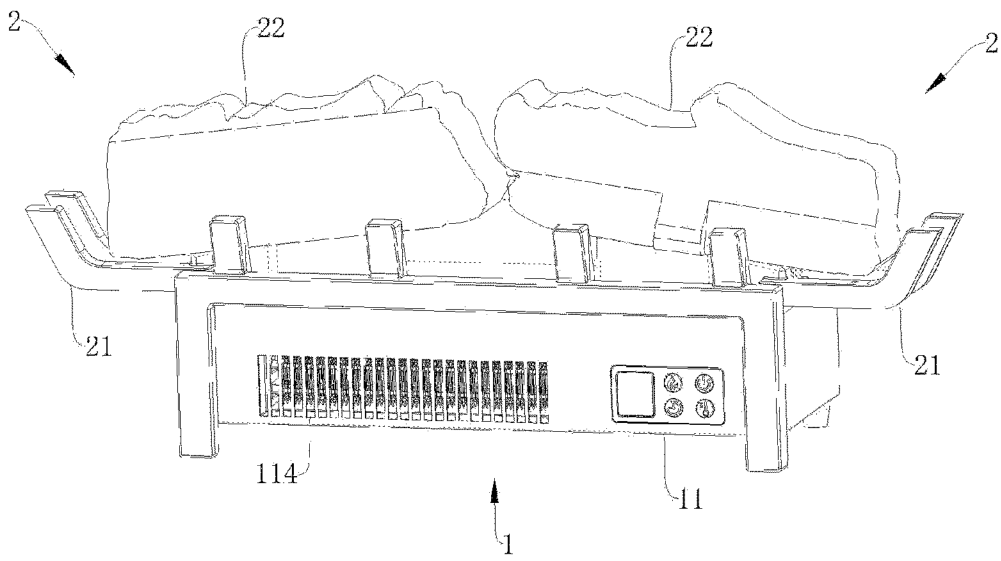
FIG. 1 is a structural schematic diagram of a detachable electric fireplace of the present disclosure.
Figure 2:
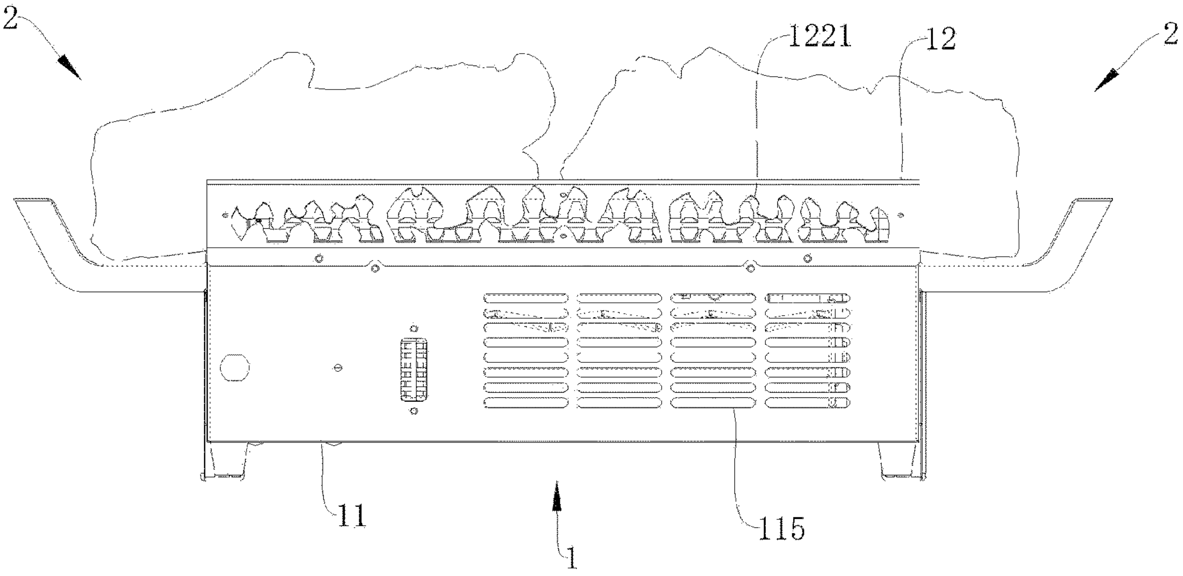
FIG. 2 is a rear side schematic diagram of the detachable electric fireplace of the present disclosure.
Figure 3:
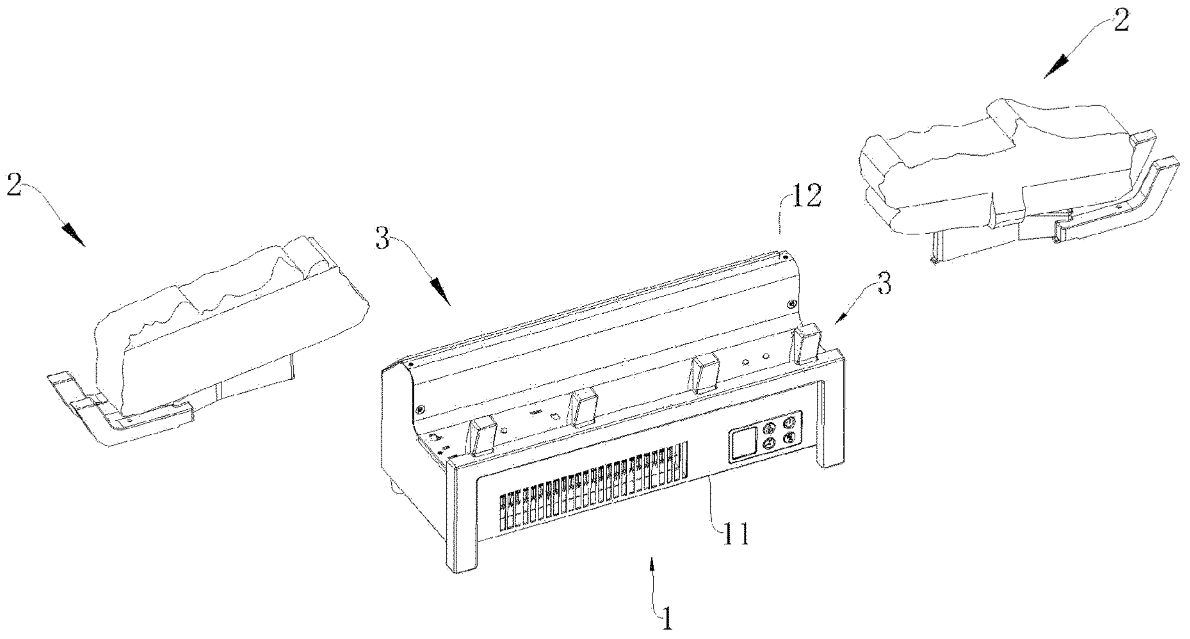
FIG. 3 is a partial exploded schematic diagram of the detachable electric fireplace of the present disclosure.
Figure 4:
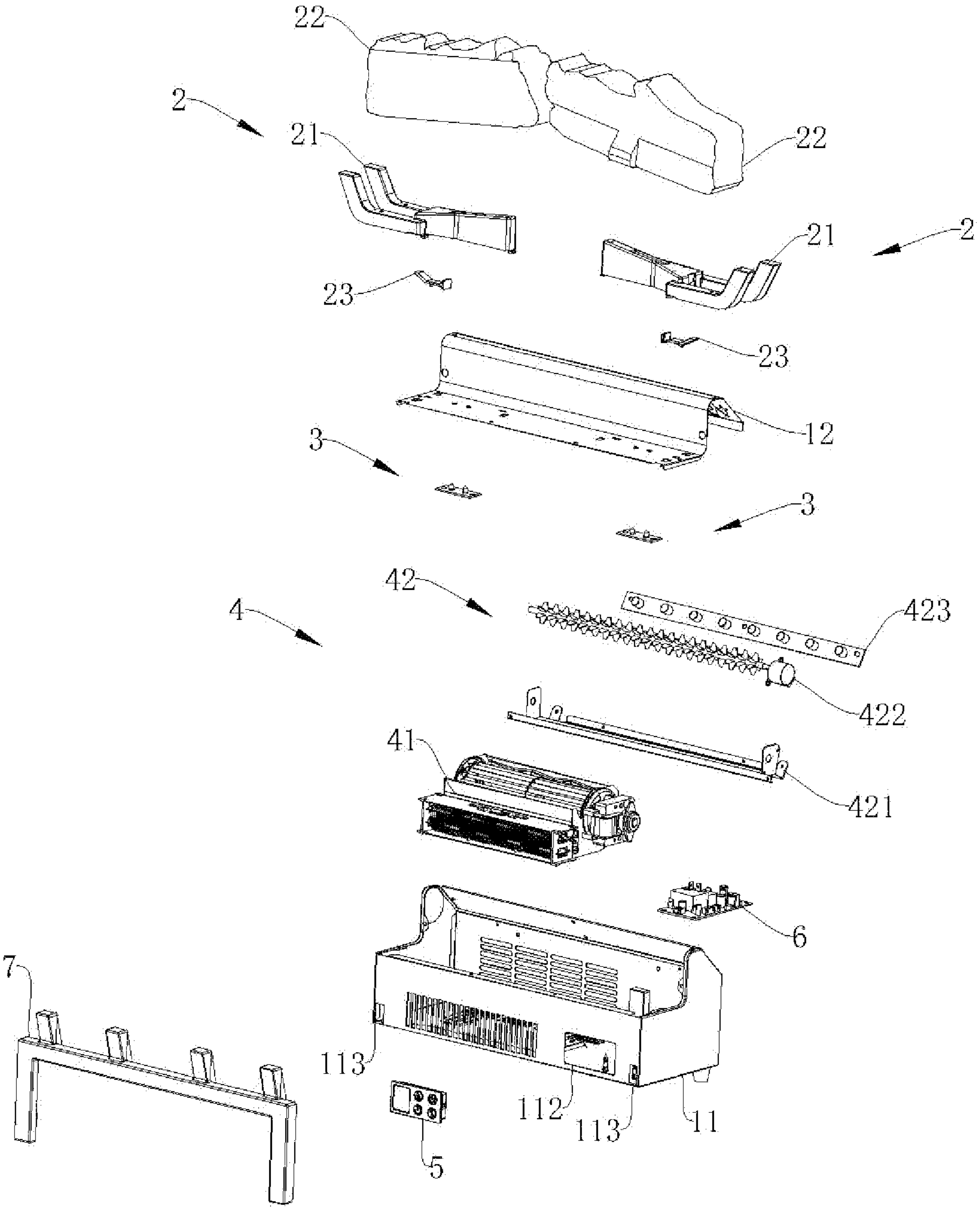
FIG. 4 is an exploded schematic diagram of the detachable electric fireplace of the present disclosure.

1—base; 11—base main body; 112—window; 113—mounting hole; 114—air outlet; 115—air inlet; 12—cover plate; 121—mounting portion; 1211—first through hole; 1212—second through hole; 1213—third through hole; 122—back cover portion; 1221—flame-shaped through hole; 2—artificial firewood assembly; 21—firewood support; 211—inclined portion; 212—horizontal portion; 213—fastener; 214—light-transmitting hole; 215—first limiting groove; 216—second limiting groove; 22—artificial firewood; 23—first limiting groove; 216—second limiting groove; 22—artificial firewood; 23—poke piece; 231—anti-slip groove; 232—boss; 42—flame lighting mechanism; 421—light shielding plate; 422—reflector; 423—light panel; 5—operation panel; 6—main control board; 7—front firewood frame.

DETAILED DESCRIPTION

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

As shown in FIGS. 1-4, the present disclosure provides a detachable electric fireplace. The detachable electric fireplace comprises a base 1, at least one artificial firewood assembly 2, at least one light source assembly 3, a flame simulation assembly 4, an operation panel 5, a main control panel 6, and a front firewood frame 7.

In the embodiment, two artificial firewood assemblies 2 are provided, and the two artificial firewood assemblies 2 are detachably disposed on a top of the base 1 and are symmetrically disposed. In the embodiment, two light source assemblies 3 are provided and the two light source assemblies 3 are detachably disposed on the base 1. The flame simulation assembly 4 is disposed inside the base 1. The operation panel 5 is disposed on an outer surface of the front end of the base 1. The main control board 6 is disposed on the base 1. The front firewood frame 7 is disposed on the front end of the base 1.

The base 1 comprises a base main body 11 and a cover plate 12. An opening is defined on a top of the base main body 11. The base main body 11 is hollow. The cover plate 12 covers on the top of the base main body 11. The main control board 6 is disposed inside the base main body 11. The main control board 6 is electrically connected to the light source assemblies 3 and the flame simulation assembly 4. A window 112 is disposed on the front end of the base main body 11. The operation panel 5 is embedded in the window 112, which is convenient for a user to install. The operation panel 5 is electrically connected to the main control board 6 and controls the light source assemblies 3 and the flame simulation assembly 4 through the main control board 6. In the embodiment, the operation panel 5 is a keypad; in other embodiments, the operation panel 5 may be configured as a touch keypad, which is not limited thereto. Mounting holes 113 are respectively defined two sides of the front end of the base main body 11. Protrusions are respectively disposed at two ends of the front firewood frame 7. The protrusions are respectively inserted into the mounting holes 113, which is convenient for the user to install.

Figure 5:
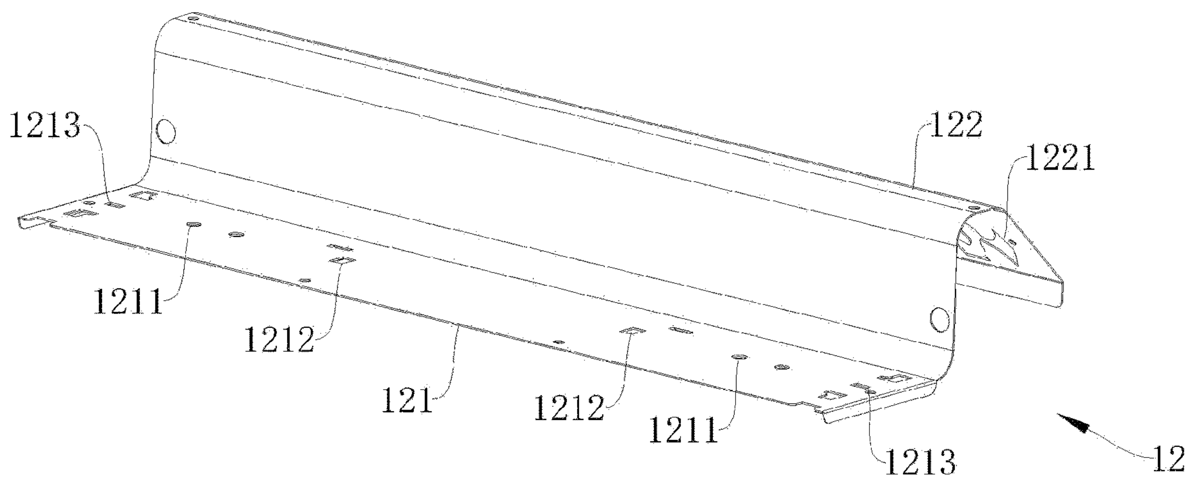
FIG. 5 is a structural schematic diagram of a cover plate of the detachable electric fireplace of the present disclosure.

As shown in FIG. 5, the cover plate 12 comprises a mounting portion 121 and a rear cover portion 122 connected to the mounting portion 121. The mounting portion 121 and the rear cover portion 122 are integrally formed.

The mounting portion 121 comprises first through holes 1211, second through holes 1212, and third through holes 1213. Flame-shaped through holes 1221 are defined on a surface of the rear cover portion 122 close to a rear end of the base main body 11.

The artificial firewood assemblies 2 are detachably mounted on the mounting part 121. Each of the artificial firewood assemblies 2 comprises a firewood support 21, an artificial firewood 22 and a poke piece 23. Each firewood support 21 is detachably disposed on the mounting portion 121. Each artificial firewood 22 is detachably disposed on a corresponding firewood support 21. Each peck piece 23 is configured to connect a corresponding firewood support 21 and the mounting portion 121. The light source assemblies 3 are detachably disposed on the mounting portion 121.

Figure 6:
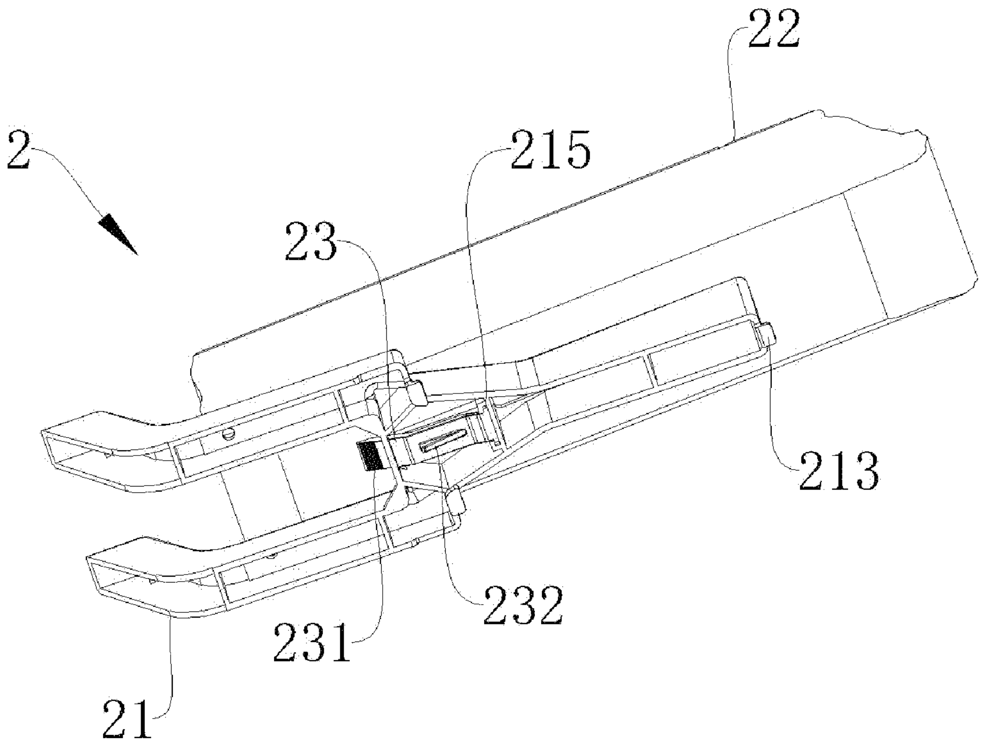
FIG. 6 is a structural schematic diagram of an artificial firewood assembly of the detachable electric fireplace of the present disclosure.
Figure 7:
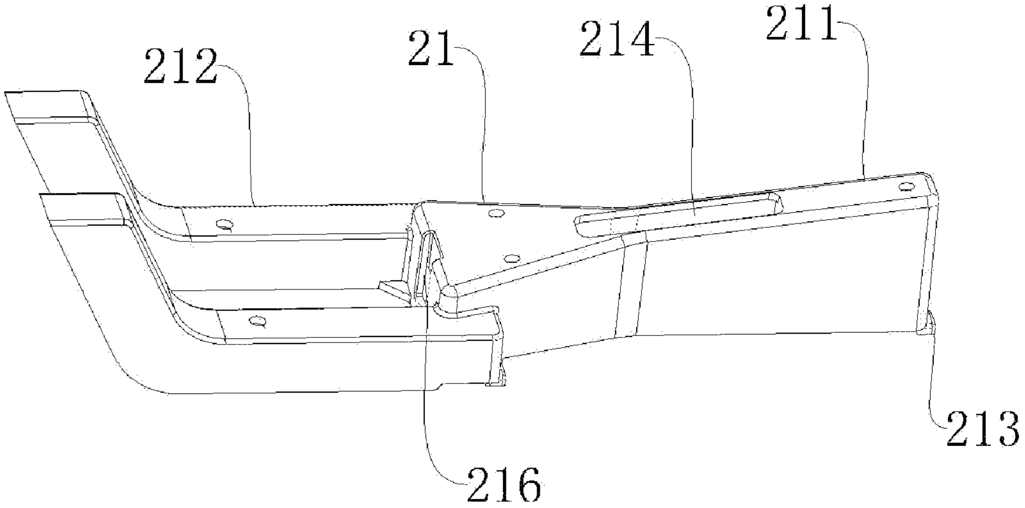
FIG. 7 is a structural schematic diagram of a firewood support of the detachable electric fireplace of the present disclosure.
Figure 8:
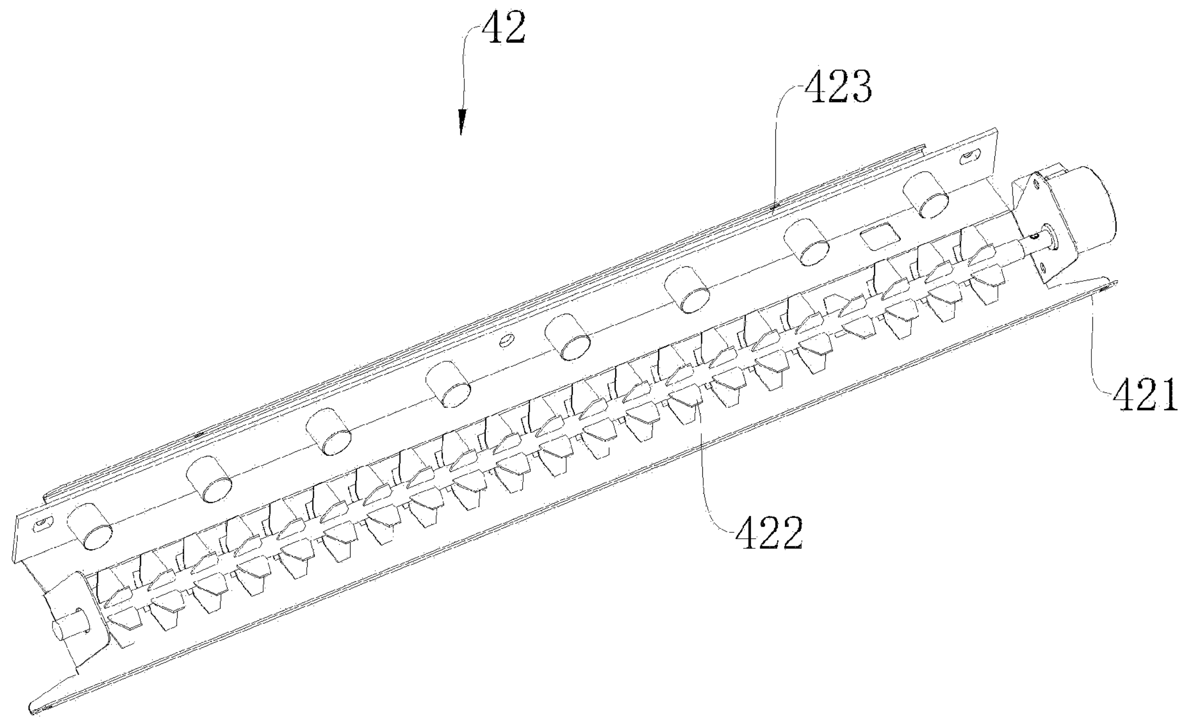
FIG. 8 is a structural schematic diagram of a flame light mechanism of the detachable electric fireplace of the present disclosure.

As shown in FIGS. 6 and 7, each firewood support 21 comprises an inclined portion 211 and a horizontal portion 212 connected to the inclined portion 211. An inclination angle of each inclined portion 211 is 5-45 degrees. Each firewood support 21 comprises fasteners 213, and the fasteners 213 are one-to-one corresponding to the second through holes 1212. By inserting the fasteners 213 one-to-one into the second through holes 1212, each firewood rack 21 is connected to the mounting portion, which is convenient for the user to install each firewood support 21 on the mounting portion 121. Each artificial firewood 22 is a light-transmitting hollow structure. Each artificial firewood 22 is detachably disposed on the inclined portion of a corresponding firewood support 21.

Each artificial firewood 22 is snapped with or screwed with the corresponding firewood support 21, which is convenient for the user to install the detachable electric fireplace. Further, after installation, each artificial firewood 22 and each firewood support 21 are able to be disassembled again for storage. Optionally, a decorative layer is disposed on outer surfaces of each artificial firewood 22 except a surface of each artificial firewood 22 contacting the corresponding firewood support 21. An uneven simulated wood grain texture is defined on a surface of each decorative layer, making a simulated wood burning scene of the detachable electric fireplace realistic.

Each firewood support 21 comprises a first limiting groove 215 and a second limiting groove 216. A first end of each poke piece 23 is inserted into a corresponding first limiting groove 215 and a second end of each poke piece passes through a corresponding second limiting groove 216. A boss 232 is disposed on a bottom of each poke piece 23. Each boss 232 is inserted into a corresponding one of the third through holes 1213. Each poke piece enhances a connection between each firewood support and the cover plate, which improves stability of the detachable electric fireplace. Each poke piece 23 is a plastic piece. An anti-slip groove 231 is defined on a bottom of the second end of each poke piece 23 passing through the corresponding second limiting groove, which facilitates the user to install each poke piece 23 on the corresponding firewood support 21 and brings a good experience to the user.

Each of the light source assemblies 3 comprises LED lamp beads, and the LED lamp beads respectively pass through the first through holes 1211 on the mounting portion 121. A light-transmitting hole 214 is defined on each firewood support 21. Each light-transmitting hole 214 is disposed above the first through holes 1211. Each artificial firewood is detachably disposed on a corresponding firewood support 21 and is disposed above a corresponding light-transmitting hole 214. After the LED lamp beads of the light source assemblies 3 respectively pass through the first through holes 1211, light emitted by the LED lamp beads illuminates on each artificial firewood 22 having the light-transmitting hollow structure through each light-transmitting hole 214 of each firewood support 21, so as to light up each artificial firewood 22 to simulate a firewood burning scene. Therefore, there is no need to dispose lamp beads inside each artificial firewood 22, and a step of docking each artificial firewood 22 with connecting wires is omitted, which simplifies installation steps and reduces a difficulty for users to install the detachable electric fireplace by themselves. At the same time, it also avoids a risk of light failure caused by loosen of terminals of the connecting wires, which is conducive to improving the user experience.

The flame simulation assembly 4 is disposed inside the base main body 11. The flame simulation assembly 4 comprises a heating mechanism 41 and a flame light mechanism 42. The flame light mechanism 42 is disposed inside the base main body 11. The heating mechanism 41 is connected to the base main body through snapping structures or screws. An air outlet 114 is defined on the front end of the base main body 11. An air inlet 115 is defined on the rear end of the base main body 11. Air heated by the heating mechanism 41 is output from the air outlet 114 defined on the front end of the base main body 11, which realizes a heating function of detachable electric fireplace. In the embodiment, the air outlet 114 and the air inlet 115 are grille structures. The air outlet 114 and the air inlet 115 are disposed in a grille structure, which reduce a noise generated by the detachable electric fireplace when the air is released for heating, and brings a good user experience. In other embodiments, the air outlet 114 and the air inlet 115 are configured to be through holes disposed in an array, and the through holes are circular holes or special-shaped holes. Alternatively, horn-shaped mesh enclosures are respectively disposed in the air outlet 114 and the air inlet 115 to realize reducing the noise generated by the detachable electric fireplaces when heating. Structures of the air outlet 114 and the air inlet 115 are limited thereto.

The flame light mechanism is disposed inside the base main body 11, and the flame light mechanism comprises a light shielding plate 421, a reflector 422, and a light panel 423. The light shielding plate 421 is detachably disposed on the base main body 11.

The light-shielding plate 421 and the back cover 122 of the cover plate 12 form an accommodation cavity. The reflector 422 and the light panel 423 are accommodated in the accommodation cavity, thereby improving a space utilization rate of an interior of the detachable electric fireplace.

Specifically, the reflector 422 is disposed on an inner side of the light shielding plate 421. The light panel 423 is disposed on the inner side of the light shielding plate 421 and opposite to the reflector 422. The reflector 422 reflects light emitted by the light panel 423 to the flame-shaped through holes 1221 on the rear cover portion 122. The light is projected on a wall through the flame-shaped through holes 1221, which simulates a scene of burning flames. The reflector 422 rotates to make the scene of burning flames simulated by the detachable electric fireplace realistic and makes a three-dimensional visual effect good.

When the user installs the detachable electric fireplace, the steps of arranging lamp beads inside each artificial firewood 22 and connecting each artificial firewood with the connecting wires are omitted. The user only needs to install the light source assemblies 3 on the bottom of the mounting portion 121 of the cover plate 12, and the LED lamp beads respectively pass through the first through holes 1211 on the mounting portion 121. The light emitted by the LED lamp beads penetrates through each light-transmitting hole 214. The light is illuminated on each artificial firewood 22 to illuminate each artificial firewood 22, which reduces the difficulty of installation of the detachable electric fireplace by the user and provides a good user experience. When the detachable electric fireplace is in use, the detachable electric fireplace simulates the scenes of firewood burning and burning flames, and the three-dimensional visual effect is good. When the detachable electric fireplace is not in use, the user is able to disassemble the detachable electric fireplace for storage, which is highly practical.

The above embodiments are optional embodiments of the present disclosure, but the embodiments of the present disclosure are not limited by the foregoing embodiments, and any other changes, modifications, substitutions, combinations, and simplification made without departing from the spirit and principle of the present disclosure should be regarded as equivalent replacement manners, which are all comprised within the protection scope of the present disclosure.

What is claimed is:

1. A detachable electric fireplace, comprising:

a base, at least one artificial firewood assembly detachably disposed on a top of the base, at least one light source assembly detachably disposed on the base, and a flame simulation assembly disposed inside the base;

wherein the at least one artificial firewood assembly comprises a firewood support and an artificial firewood; the firewood support is detachably disposed on the base; a light-transmitting hole is defined on the firewood support; the artificial firewood is detachably disposed on the firewood support and is disposed above the light-transmitting hole; the artificial firewood is a light-transmitting hollow structure; the at least one light source assembly is disposed below the light-transmitting hole; light emitted by the at least one light source assembly penetrates through the light-transmitting hole to light up the artificial firewood;

wherein the base comprises a base main body and a cover plate; an opening is defined on a top of the base main body; the base main body is hollow; the cover plate covers on the top of the base main body; the flame simulation assembly is disposed inside the base main body;

wherein the cover plate comprises a mounting portion and a rear cover portion connected to the mounting portion; the at least one artificial firewood assembly is detachably disposed on the mounting portion; the at least one artificial firewood assembly comprises the firewood support detachably disposed on the mounting portion and the artificial firewood detachably disposed on the firewood support; the at least one light source assembly is detachably disposed on the mounting portion;

wherein the firewood support comprises an inclined portion and a horizontal portion connected to the inclined portion; an inclination angle of the inclined portion is 5-45 degrees; the artificial firewood is detachably disposed on the inclined portion of the firewood support.

2. The detachable electric fireplace according to claim 1, wherein the mounting portion comprises first through holes, and the first through holes are located below the light-transmitting hole of the firewood support; the at least one light source assembly comprises LED lamp beads, and the LED lamp beads respectively pass through the first through holes to illuminate the artificial firewood.

3. The detachable electric fireplace according to claim 1, wherein the firewood support comprises fasteners, and the mounting portion comprises second through holes corresponding to the fasteners; the fasteners are one-to-one inserted into the second through holes.

4. The detachable electric fireplace according to claim 3, wherein the firewood support comprises a first limiting groove and a second limiting groove; third through holes are defined on the mounting portion;

wherein the at least one artificial firewood assembly comprises a poke piece configured to connect the firewood support to the mounting portion; a first end of the poke piece is inserted into the first limiting groove and a second end of the poke piece passes through the second limiting groove; a boss is disposed on a bottom of the poke piece; the boss is inserted into a corresponding one of the third through holes.

5. The detachable electric fireplace according to claim 3, wherein an anti-slip groove is defined on a bottom of the second end of the poke piece passing through the second limiting groove.

6. The detachable electric fireplace according to claim 5, wherein the poke piece is a plastic piece.

7. The detachable electric fireplace according to claim 1, wherein the flame simulation assembly comprises a heating mechanism disposed inside the base main body and a flame light mechanism disposed inside the base main body; an air outlet is defined on a front end of the base main body; an air inlet is defined on a rear end of the base main body.

8. The detachable electric fireplace according to claim 7, wherein the flame light mechanism comprises a light shielding plate, a reflector, and a light panel; the light shielding plate is detachably disposed on the base main body; the reflector is disposed on an inner side of the light shielding plate; the light panel is disposed on the inner side of the light shielding plate and opposite to the reflector;

wherein flame-shaped through holes are defined on a surface of the rear cover portion close to the rear end of the base main body; the reflector reflects light emitted by the light panel to the flame-shaped through holes on the rear cover portion.

9. The detachable electric fireplace according to claim 8, wherein the light shielding plate is detachably disposed on the base main body and surrounds the rear cover portion of the cover plate to form an accommodating cavity; the reflector and the light panel are accommodated in the accommodating cavity.

10. The detachable electric fireplace according to claim 7, wherein the air outlet is of a grille structure or through holes disposed in an array; the air inlet is of a grille structure or through holes disposed in an array; when the air outlet and the air inlet are through holes, the through holes are circular holes.

11. The detachable electric fireplace according to claim 1, wherein a main control board is disposed inside the base main body; the main control board is electrically connected to the at least one light source assembly and the flame simulation assembly; a window is disposed on a front end of the base main body; an operation panel is embedded in the window; the operation panel is electrically connected to the main control board and controls the at least one light source assembly and the flame simulation assembly through the main control board.

12. The detachable electric fireplace according to claim 1, wherein the mounting portion and the rear cover portion are integrally formed.

13. The detachable electric fireplace according to claim 1, wherein the artificial firewood is snapped with or screwed with the firewood support.

14. The detachable electric fireplace according to claim 1, wherein a decorative layer is disposed on outer surfaces of the artificial firewood except a surface of the artificial firewood contacting the firewood support; an uneven simulated wood grain texture is defined on a surface of the decorative layer.

15. The detachable electric fireplace according to claim 1, wherein the detachable electric fireplace further comprises a front firewood frame disposed on a front end of the base main body.

16. The detachable electric fireplace according to claim 15, wherein mounting holes are respectively defined on two sides of the front end of the base main body; protrusions are respectively disposed at two ends of the front firewood frame; the protrusions are respectively inserted into the mounting holes.

17. A detachable electric fireplace, comprising:

a base, at least one artificial firewood assembly detachably disposed on a top of the base, at least one light source assembly detachably disposed on the base, and a flame simulation assembly disposed inside the base;

wherein the at least one artificial firewood assembly comprises a firewood support and an artificial firewood; the firewood support is detachably disposed on the base; a light-transmitting hole is defined on the firewood support; the artificial firewood is detachably disposed on the firewood support and is disposed above the light-transmitting hole; the artificial firewood is a light-transmitting hollow structure; the at least one light source assembly is disposed below the light-transmitting hole; light emitted by the at least one light source assembly penetrates through the light-transmitting hole to light up the artificial firewood;

wherein the base comprises a base main body and a cover plate; an opening is defined on a top of the base main body; the base main body is hollow; the cover plate covers on the top of the base main body; the flame simulation assembly is disposed inside the base main body;

wherein the cover plate comprises a mounting portion and a rear cover portion connected to the mounting portion; the at least one artificial firewood assembly is detachably disposed on the mounting portion; the at least one artificial firewood assembly comprises the firewood support detachably disposed on the mounting portion and the artificial firewood detachably disposed on the firewood support; the at least one light source assembly is detachably disposed on the mounting portion;

wherein the mounting portion comprises through holes, and the through holes are located below the light-transmitting hole of the firewood support; the at least one light source assembly comprises LED lamp beads, and the LED lamp beads respectively pass through the through holes to illuminate the artificial firewood.

18. A detachable electric fireplace, comprising:

a base, at least one artificial firewood assembly detachably disposed on a top of the base, at least one light source assembly detachably disposed on the base, and a flame simulation assembly disposed inside the base;

wherein the at least one artificial firewood assembly comprises a firewood support and an artificial firewood; the firewood support is detachably disposed on the base; a light-transmitting hole is defined on the firewood support; the artificial firewood is detachably disposed on the firewood support and is disposed above the light-transmitting hole; the artificial firewood is a light-transmitting hollow structure; the at least one light source assembly is disposed below the light-transmitting hole; light emitted by the at least one light source assembly penetrates through the light-transmitting hole to light up the artificial firewood;

wherein the base comprises a base main body and a cover plate; an opening is defined on a top of the base main body; the base main body is hollow; the cover plate covers on the top of the base main body; the flame simulation assembly is disposed inside the base main body;

wherein the cover plate comprises a mounting portion and a rear cover portion connected to the mounting portion; the at least one artificial firewood assembly is detachably disposed on the mounting portion; the at least one artificial firewood assembly comprises the firewood support detachably disposed on the mounting portion and the artificial firewood detachably disposed on the firewood support; the at least one light source assembly is detachably disposed on the mounting portion;

wherein the firewood support comprises fasteners, and the mounting portion comprises through holes corresponding to the fasteners; the fasteners are one-to-one inserted into the through holes.

* * * * *